US007019238B2

(12) United States Patent
Kobayashi

(10) Patent No.: US 7,019,238 B2
(45) Date of Patent: Mar. 28, 2006

(54) STALK SWITCH

(75) Inventor: Ayumu Kobayashi, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/827,808

(22) Filed: Apr. 20, 2004

(65) Prior Publication Data

US 2004/0206611 A1 Oct. 21, 2004

(30) Foreign Application Priority Data

Apr. 21, 2003 (JP) ............................ 2003-115771

(51) Int. Cl.
*H01H 9/00* (2006.01)

(52) U.S. Cl. ...................................... 200/310; 200/6 A

(58) Field of Classification Search ......... 200/61.45 R, 200/6 A, 61.27, 12, 61.3, 17 R, 61.31, 335; 335/106, 107, 114, 116, 122; 345/170
See application file for complete search history.

(56) References Cited

U.S. PATENT DOCUMENTS

| | | | | |
|---|---|---|---|---|
| 3,312,917 | A * | 4/1967 | Garcia | 335/122 |
| 4,333,071 | A * | 6/1982 | Kira et al. | 340/477 |
| 4,364,047 | A * | 12/1982 | Archer | 324/660 |
| 4,459,440 | A * | 7/1984 | Wiczer | 200/6 A |
| 4,473,725 | A * | 9/1984 | Kim | 200/6 A |
| 4,721,834 | A * | 1/1988 | Mark et al. | 200/6 A |
| 4,733,214 | A | 3/1988 | Andresen | |
| 5,162,671 | A * | 11/1992 | Ishihara | 327/74 |
| 5,252,821 | A * | 10/1993 | Sugimura | 250/221 |
| 5,555,004 | A * | 9/1996 | Ono et al. | 345/161 |
| 6,201,196 | B1 * | 3/2001 | Wergen | 200/6 A |
| 6,300,852 | B1 * | 10/2001 | Kato | 335/170 |
| 6,320,487 | B1 * | 11/2001 | Miller et al. | 335/274 |
| 6,348,911 | B1 * | 2/2002 | Rosenberg et al. | 345/161 |
| 6,353,430 | B1 * | 3/2002 | Cheng et al. | 345/161 |
| 6,380,733 | B1 * | 4/2002 | Apel et al. | 324/207.2 |
| 6,468,158 | B1 * | 10/2002 | Ootori et al. | 463/38 |
| 6,486,872 | B1 * | 11/2002 | Rosenberg et al. | 345/161 |
| 6,570,107 | B1 * | 5/2003 | Nishimoto et al. | 200/6 R |
| 6,624,364 | B1 * | 9/2003 | Liburdi | 200/61.27 |
| 6,756,967 | B1 * | 6/2004 | Onodera et al. | 345/161 |
| 6,803,532 | B1 * | 10/2004 | Lee | 200/6 A |
| 6,844,510 | B1 * | 1/2005 | Prouty et al. | 200/6 A |
| 6,850,222 | B1 * | 2/2005 | Rosenberg | 345/161 |

FOREIGN PATENT DOCUMENTS

| | | |
|---|---|---|
| DE | 199 26 576 | 12/2000 |
| EP | 1 217 496 | 6/2002 |

* cited by examiner

*Primary Examiner*—Michael Friedhofer
*Assistant Examiner*—Lisa Klaus
(74) *Attorney, Agent, or Firm*—Brinks Hofer Gilson & Lione

(57) ABSTRACT

A stalk switch having a simplified structure and wide general-purpose applicability is provided. The stalk switch comprises an operating lever 4 manually operated by an operator, a supporting member 2 for rockably supporting the operating lever 4, an electromagnetic brake 5 arranged opposite to a base end of the operating lever 4, an optical image sensor 6 for detecting the operational state of the operating lever 4, and controlling means 8 for controlling the drive of the electromagnetic brake 5 based on an output signal a from the optical image sensor 6, wherein the range of movement of the operating lever 4 is defined by the electromagnetic brake 5, and a predetermined tactile response corresponding the operational state is given to the operating lever 4.

19 Claims, 4 Drawing Sheets

STALK SWITCH

This application claims the benefit of priority to Japanese Patent Application No. 2003-115771, herein incorporated by reference.

BACKGROUND OF THE INVENTION

1. Field of the Invention

The present invention relates to a stalk switch for operating turn signal lamps or windshield wipers attached to a steering column of an automobile.

2. Description of the Related Art

Typically, a pair of stalk switches is attached to a steering column of an automobile. One stalk switch is generally referred to as a turn signal switch for operating turn signal lamps and/or headlights, and the other stalk switch is used for operating windshield wipers or a washing solution. Of these stalk switches, the turn signal switch rotatably supports a base end of an operating lever on a housing integrally formed with the steering column. By rotating the front end of the operating lever from a neutral position to either one of the right and left positions, a turn signal lamp for the right or left direction turns on and off, and by rotating the operating lever in a direction perpendicular to the turn signal position, headlight beam switching or flashing for passing is performed.

In the related art, it has been proposed a turn signal switch in which an operating member fits to an operating lever to integrate them as one piece, a holder is rotatably connected to the operating member protruding from the operating lever, and a pair of supporting shafts provided on the holder is rotatably supported on the housing (for example, see Patent Document 1). In this case, a rotating axis of the operating lever with respect to the housing and a rotating axis of the operating member with respect to the holder are perpendicular to each other, and a driving member is slidably held at the operating member through a spring, and the front end of the driving member always comes into press contact with a cam formed on the inner surface of the holder. In addition, another driving member is slidably held in the holder through a spring, and the front end of the driving member always comes into press contact with another cam formed on the inner surface of the housing.

In the turn signal switch constructed as above, when the operator (i.e., the driver) rotates the operating lever from a neutral position to either one of the right and left positions, the operating lever, the operating member, and the holder integrally rotate around the supporting axis of the holder as a center, and the driving member held in the holder slides along the cam of the housing. Accordingly, the operating lever is locked in a turn signal position, and thus a turn signal lamp for turning to the right or the left turns on and off. In the meantime, when the operator rotates the operating lever in a direction perpendicular to the above turn signal position, the holder does not rotate, and the operating lever and the operating member rotate with respect to the holder. Accordingly, the headlight beam switching or flashing for passing is performed. At this time, the driving member held in the operating member slides along the cam of the holder, and sufficient restoring force builds up in the operating member. Accordingly, the operating lever and the operating member return to the neutral position by the restoring force.

[Patent Document 1]

Japanese Unexamined Patent Application Publication No. 10-269900 (pages 3 to 5, and FIG. 1)

However, in the above-mentioned conventional stalk switch, it is necessary to combine many components, such as a holder having cams, a plurality of driving members, and springs to form a supporting structure for locking the operating lever at a turn signal position or for rotatably operating the operating lever in a direction perpendicular to the turn signal position. Thus, the conventional stalk switch has a very complicated structure, and it costs a great deal to fabricate it. In particular, in the case of the stalk switch as a turn signal switch, when the steering wheel is rotated in a direction opposite to the desired direction in a state in which the operating lever is rotated in the right or left direction, a cancel mechanism should be added to automatically return the operating lever to its neutral position, which causes a more complicated structure due to the added cancel mechanism.

In addition, in this kind of stalk switch, it is common to mount a pair of stalk switches in a common housing to make a combination switch. However, the arrangement of these stalk switches for turn signals and windshield wipers to the right and left of the steering wheel may be different in each country having local road laws and regulations, and various car makers and models of cars have different maintaining forces for locking the operating lever of the turn signal switch at a turn signal position, and different amounts of stroke from the neutral position of the operating lever. As such, in the aforementioned conventional stalk switch, the sizes and shapes of the components constituting the stalk switch must be changed according to various required purposes, thereby degrading general-purpose applicability.

SUMMARY OF THE INVENTION

The present invention is designed to solve the above problems of the conventional technique, and it is an object of the present invention to provide a stalk switch having a simplified structure and wide general-purpose applicability.

To achieve the object, the present invention provides a stalk switch comprising an operating lever manually operated by an operator; a supporting member for rockably supporting the operating lever; an actuator arranged opposite to a base end of the operating lever; detecting means for detecting an operational state of the operating lever; and controlling means for controlling the drive of the actuator based on an output signal from the detecting means, wherein the range of movement of the operating lever is defined by the actuator, and a predetermined tactile response corresponding to the operational state is given to the operating lever.

In the stalk switch having the above-mentioned structure, the actuator is driven based on the output signal from the detecting means corresponding to the operational state of the operating lever. In addition, the range of movement of the operating lever is defined by the actuator, and a predetermined tactile response corresponding to the operational state is given to the operating lever. Thus, the range of movement of the operating lever-4 can be set to any values, and a feeling or the lock maintaining force required for the operating lever-4 can also be set to any values, which results in the turn signal switch having a simplified structure and wide general-purpose applicability.

In the above-mentioned structure, preferably, the actuator comprises an electromagnetic brake having an armature and an electromagnetic coil, wherein the armature is attached to the base end of the operating lever through a spring member, and an end surface of a yoke wound with the electromagnetic coil is opposite to the armature. In addition, preferably, the actuator comprises the electromagnetic brake having the armature attached to the base end of the operating lever and the yoke wound with the electromagnetic coil, wherein the end surface of the yoke is opposite to the armature, and the yoke is attached to a setting member through a spring member. In this case, both end surfaces of the armature and the yoke opposite to each other are preferably formed of a spherical surface whose center is a rocking point of the operating lever.

In the above-mentioned structure, preferably, an optical image sensor is used as the detecting means, and light emitted from a light source is reflected from the armature and is then incident on the optical image sensor to detect the operational state of the operating lever. In this case, an image guide is preferably provided between the armature and the optical image sensor and is arranged at the center of the electromagnetic coil, thereby further simplifying the entire structure of the stalk switch.

In addition, in the above-mentioned structure, when an elastic member is provided for automatically returning the operating lever to its neutral position that is set in the supporting member, the operating lever may be automatically returned to its neutral position by means of the elastic member even when the operator takes his hands off the operating lever. In this case, when a steering angle signal of the steering wheel is input to the controlling means and the controlling means controls the drive of the actuator based on the steering angle signal and the output signal from the detecting means, a turn signal switch having a cancel mechanism can be achieved.

DESCRIPTION OF THE PREFERRED EMBODIMENT

Figure 1:
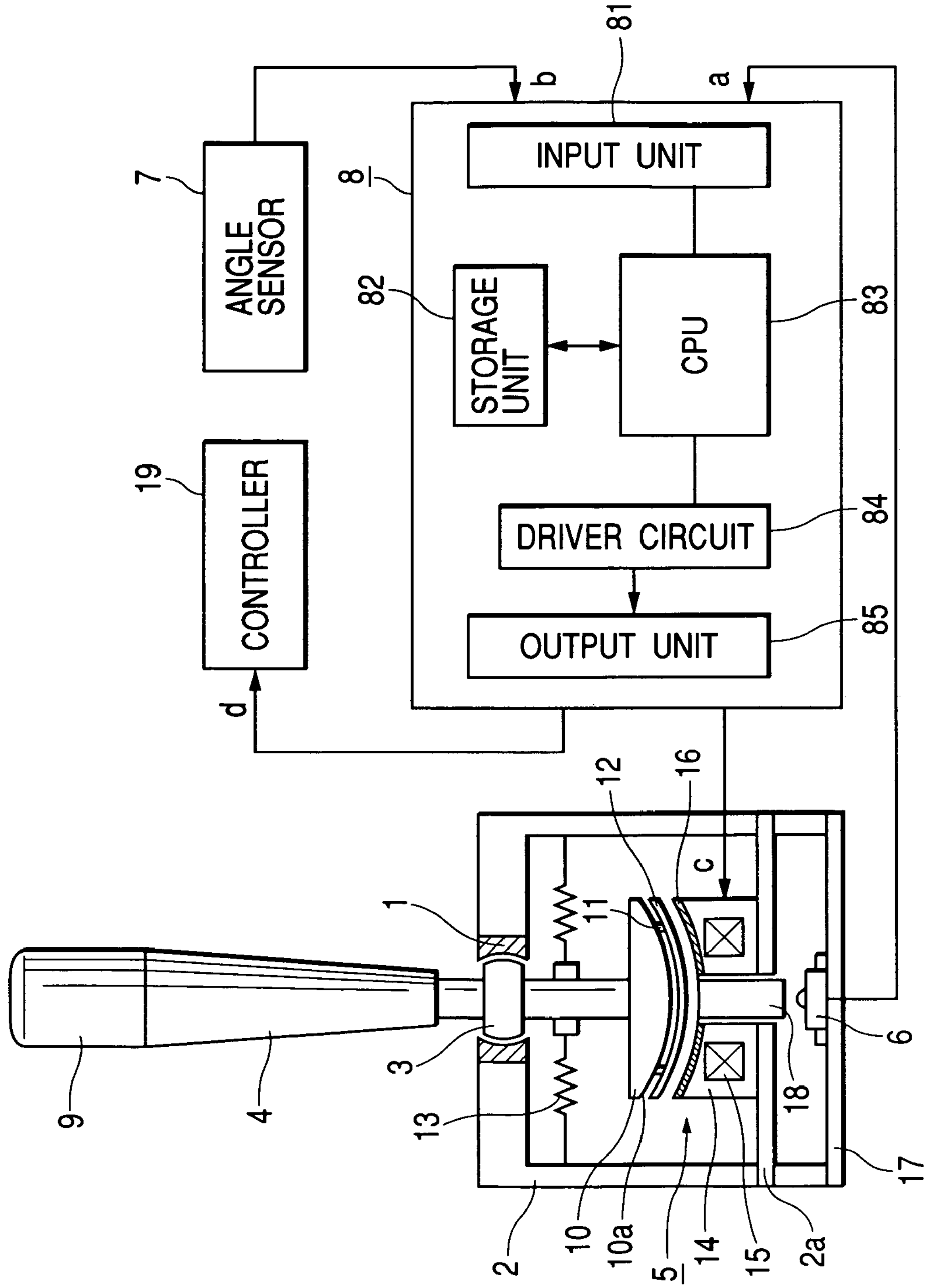
FIG. 1 is a view illustrating the structure of a stalk switch in accordance with one embodiment of the present invention.
Figure 2:
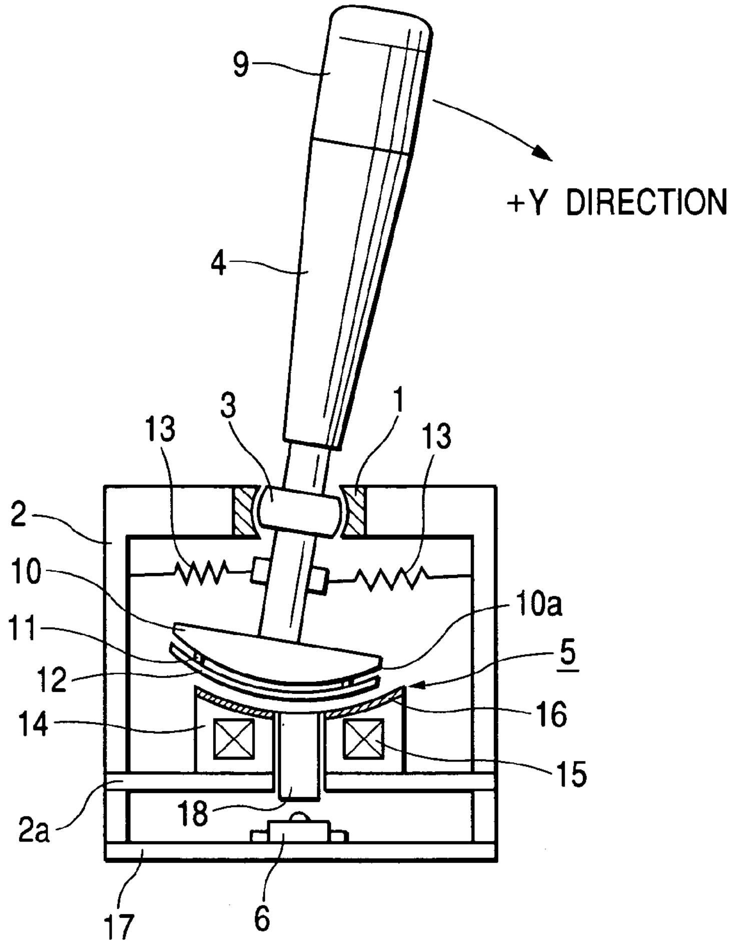
FIG. 2 is a view for explaining the operation of an operating lever mounted in the stalk switch.
Figure 3:
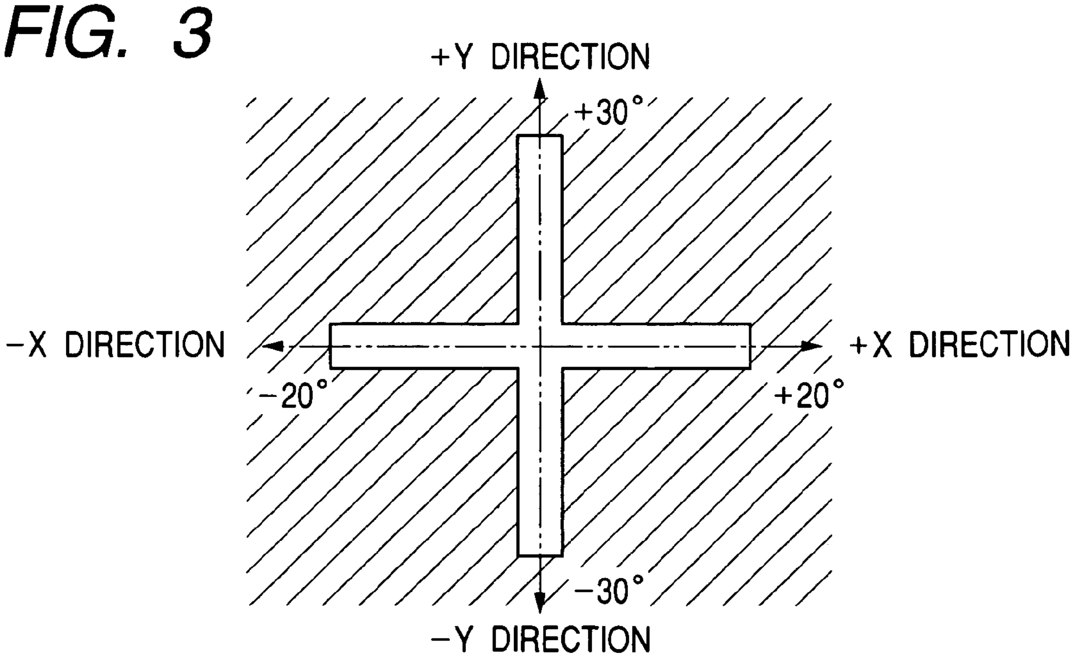
FIG. 3 is an explanatory diagram illustrating the range of movement of the operating lever.

Hereinafter, preferred embodiments of the present invention will be described with reference to the accompanying drawings. FIG. 1 is a view illustrating the structure of a stalk switch in accordance with one embodiment of the present invention. FIG. 2 is an explanatory diagram illustrating the operation of an operating lever mounted in the stalk switch. FIG. 3 is an explanatory diagram illustrating the range of motion of the operating lever. FIG. 4 is an explanatory diagram illustrating external force applied to the operating lever.

The stalk switch in accordance with the present embodiment is applied to a turn signal switch. As shown in FIG. 1, the turn signal switch comprises a supporting member 2 having a spherical bearing 1, an operating lever 4 having a spherical surface portion supported by the spherical bearing 1, an electromagnetic brake 5 disposed opposite to the lower end of the operating lever 4, an optical image sensor 6 for detecting an operational state of the operating lever 4, an angle sensor 7 for detecting a steering angle of a steering wheel (not shown), and control means 8 for outputting a driving signal c for the electromagnetic brake 5 based on output signals a and b received from the optical image sensor 6 and the angle sensor 7, respectively.

The spherical surface portion 3 is formed a little to the base of the operating lever and is supported by the spherical bearing 1, so that the operating lever 4 is supported so as to freely rock with respect to the supporting member 2. A knob 9 is attached to the front end of the operating lever 4. For example, by rotating the knob 9 around an axis of the operating lever 4, a rotary switch (not shown) is driven to turn on and off headlights. Alternatively, by pressing the knob 9 in the axial direction of the operating lever 4, a push switch (not shown) may be driven to turn on and off headlights. In addition, an external force receiving portion 10 is formed of a substantially hemispherical shape at the lower end of the operating lever 4 integrally with the operating lever 4, and an armature 12 formed of a magnetic material is formed at the lower end surface 10*a* of the external power receiving portion 10 with a spring member 11, such as a plate spring, interposed therebetween. The lower end surface 10*a* is formed of a spherical shape whose center is a rocking point (i.e., the spherical surface portion 3) of the operating lever 4, and the armature 12 is also formed of a spherical shape corresponding to the shape of the lower end surface 10*a* of the operating lever 4. Furthermore, a plurality of springs 13 extends between the supporting member 2 and the operating lever 4 on the lower side of the spherical surface portion 3, so that the operating lever 4 may be automatically returned to its neutral position (where the operating lever 4 is vertically positioned with respect to the supporting member 2) by means of elastic force of the springs 13.

The electromagnetic brake 5 is an actuator for applying predetermined external force to the operating lever 4. The electromagnetic brake 5 includes the armature 12 attached to the external force receiving portion 10 of the operating lever 4, a yoke 14 disposed opposite to the armature 12 and fixed to an attaching plate 2*a* that is a part of the supporting member 2, and an electromagnetic coil 15 wound around the yoke 14. A lining material 16 is attached to the upper surface of the yoke 14, and the upper surface of the yoke 14 and the lining material 16 are also formed of spherical shapes corresponding to that of the lower end surface 10*a* of the operating lever 4.

The optical image sensor 6 is mounted on a circuit board 17 integrated with the supporting member 2, and a light source (not shown) is also mounted on the circuit board 17. An image guide 18 is provided between the optical image sensor 6 and the armature 12 and is also arranged in a central position of the yoke 14 and the electromagnetic coil 15. In addition, a predetermined detection pattern is formed on the outer surface of the armature 12. The armature 12 is irradiated with light emitted from the light source, and an image of the detection pattern formed on the outer surface of the armature is then guided to the optical image sensor 6 through the image guide 18. Therefore, the amount of movement of the operating lever 4 in the X-Y coordinates, that is, the rocking direction and the rocking amount (i.e., the rocking angle) of the operating lever 4, can be detected.

The controlling means 8 includes an input unit 81 for inputting the output signal a from the optical image sensor 6 and the output signal b from the angle sensor 7, a storage unit 82 for storing any external force tables, a CPU 83 for reading out from the storage unit 82 control signals corresponding to the output signals a and b input to the input unit

81 and for outputting them, a driver circuit 84 for digital-to-analog converting and amplifying the control signals output from the CPU 83 to generate a driving signal c for the electromagnetic coil 15 of the electromagnetic brake 5 and a driving signal d for an external controller 19, and an output unit 85 for outputting the driving signals c and d. The CPU 83 receives the output signal a from the optical image sensor 6 and the output signal b from the angle sensor 7 through the input unit 81, and calculates the rocking direction and the rocking amount of the operating lever 4 based on the output signal a from the optical image sensor 6, and also determines whether the operating lever 4 should be automatically returned to its neutral position based on the output signal b from the angle sensor 7. The storage unit 82 stores an external force table corresponding to external force applied from the electromagnetic brake 5 to the operating lever 4. The range of movement of the operating lever 4 is defined by the external force, and a predetermined tactile response is also given to the operating lever 4. That is, in the electromagnetic brake 5, the absorption force of the armature 12 is varied according to the amount of current flowing through the electromagnetic coil 15. Thus, when the driving signal c having a high current value is supplied to the electromagnetic coil 15, a high brake force can be applied to the operating lever 4 in operation to define the range of movement of the operating lever 4, and when the driving signal c having a relatively low current value is supplied to the electromagnetic coil 15, a click feeling or resistance feeling can be given to the operating lever 4 in operation.

In the present embodiment, as shown in FIG. 3, the +X, −X, +Y, and −Y rocking directions are defined from the neutral position of the operating lever 4, and the rocking angle of the operating lever 4 is defined from +20° to −20° in the +X and −X directions, and the rocking angle of the operating lever 4 is defined from +30° to −30° in the +Y and −Y directions. In this case, the +X, −X, +Y, and −Y directions represent a right turn operation of the turn signal, a left turn operation of the turn signal, an operation for changing to high beam headlights, and an operation for flash-to-pass of headlights, respectively. In addition, a predetermined click feeling is given at a position before the rocking range of the operating lever 4 in the +X, −X, +Y, and −Y directions.

Figure 4A:
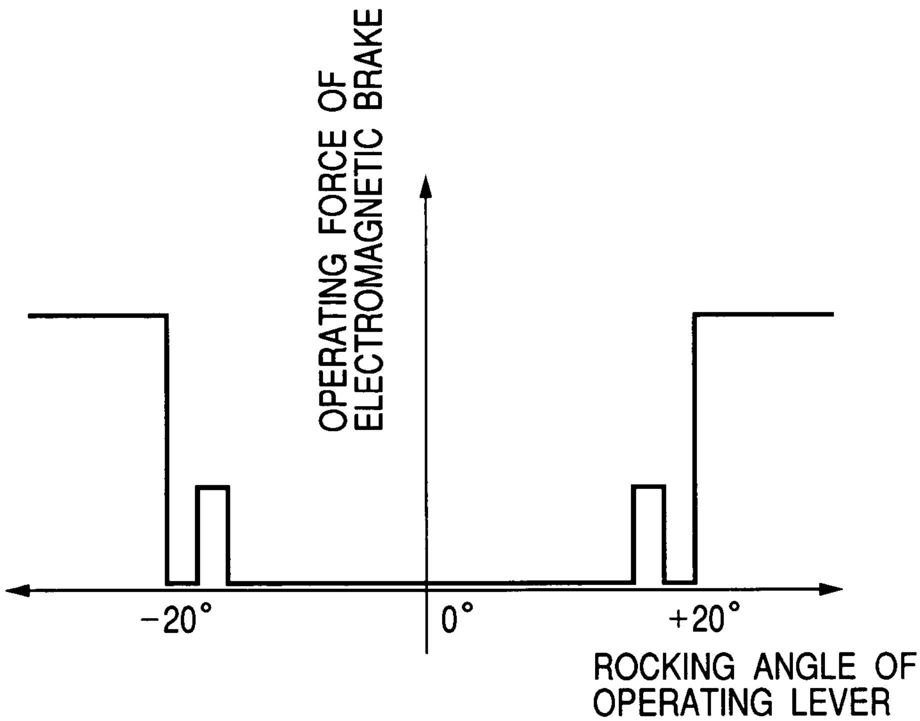
FIGS. 4A and 4B are explanatory diagrams illustrating external force applied to the operating lever.
Figure 4B:
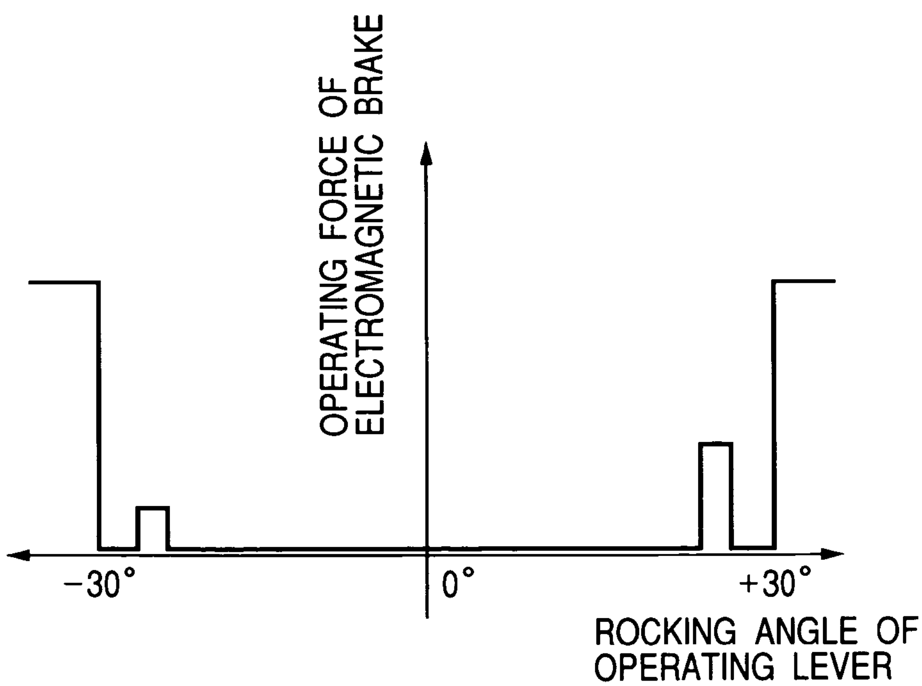

As mentioned above, the rocking range to be defined and the click feeling to be given for the operating lever 4 can be controlled by the driving signal c output from the output unit 85 of the controlling means 8 to the electromagnetic coil 15 of the electromagnetic brake 5. That is, when the operating lever 4 is rocked from its neutral position (0°) to the +X and −X directions as shown in FIG. 4A, the driving signal c having a predetermined current value is supplied to the electromagnetic coil 15 to give the click feeling to the operating lever 4 at the point of time when the operating lever 4 is rocked just before the ±20° limit, and the maximum value of current of the driving signal c is preferably supplied to the electromagnetic coil 15 to restrict the operation of the operating lever 4 at the point of time when the operating lever 4 is rocked up to the limit of ±20°. Alternatively, when the operating lever 4 is rocked from its neutral position (0°) to the ±Y directions as shown in FIG. 4B, the click feeling is given to the operating lever 4 by supplying the electromagnetic coil 15 with the driving signal c having a predetermined current value at the point of time when the operating lever 4 is rocked just before the ±30° limit, and the maximum value of current of the driving signal c is preferably supplied to the electromagnetic coil 15 to restrict the operation of the operating lever 4 at the point of time when the operating lever 4 is rocked up to the limit of ±30°. In addition, when the operating lever 4 is rocked in oblique directions other than the +X, −X, +Y, and −Y directions, the driving signal c having the maximum value of current is applied to the electromagnetic coil 15. Therefore, the operating lever 4 is restricted to move in the oblique directions.

The operation of the turn signal switch constructed as above will now be described. When no operating force is applied to the operating lever 4, the operating lever 4 is maintained at its neutral position (where the operating lever 4 is vertically positioned with respect to the supporting member 2) by the elastic force of each spring 13 as shown in FIG. 1. In this state, when the operator (i.e., the driver) operates the operating lever 4 from its neutral position to the right and left directions (the ±X directions in FIG. 3), for example, to the right direction as shown in FIG. 2, the operating lever 4 is rotated around the spherical surface portion 3 as a supporting point, and the external force receiving portion 10 at the lower portion of the operating lever 4 rotates in a clockwise direction around the spherical surface portion 3 as a center as shown in FIG. 3. By means of this rotation, the armature 12 attached to the external force receiving portion 10 also rotates in the clockwise direction, so that an image of a detection pattern formed on the outer surface of the armature 12 is guided to the optical image sensor 6 through the image guide 18, and the output signal a from the optical image sensor 6 is input to the input unit 81 of the controlling means 8. In the controlling means 8, the CPU 83 calculates the rocking direction and the rocking amount (the rocking angle) of the operating lever 4 based on the output signal a compares the calculated results with the external force table stored in the storage unit 82, and then a predetermined driving signal c is output from the driver circuit 84 to the electromagnetic coil 15 of the electromagnetic brake 5 through the output unit 85.

In other words, at the point of time when the operating lever 4 is rocked from its neutral position to the right direction at a predetermined angle, the driving signal c having a predetermined value of current is applied to the electromagnetic coil 15, and then the armature 12 is absorbed to the lining material 16 attached to the upper surface of the yoke 14. Therefore, this absorption force brakes the operation of the operating lever 4 in the rocking direction. Accordingly, as shown in FIG. 4A, an operating force having a predetermined value is applied from the electromagnetic brake 5 to the operating lever 4 just before the operating lever 4 is rocked up to a stroke end position (20°), and the operating lever 4 is locked at the stroke end position by means of the operating force, which is recognized as a click feeling by the operator who is holding the operating lever 4. In addition, the driving signal d is output from the output unit 85 of the controlling means 8 to the controller 19 of an automobile body when the operating lever 4 is locked at the stroke end position of the right direction, so that a turn signal lamp for the right turn is flashed. Furthermore, the same procedure can be performed when the operating lever 4 is rocked from its neutral position to the left direction. In this case, a turn signal lamp for the left turn (not shown) is flashed when the operating lever 4 is locked at the stroke end position (20°) of the −X direction.

In addition, the CPU 83 determines whether the operating lever 4 should be automatically returned to its neutral position based on the output signal b from the angle sensor 7. Therefore, as described above, when the steering wheel is rotated in a direction opposite to the rocking direction of the operating lever 4 while the operating lever 4 is locked at the right and left stroke end positions, the driving signal c to be supplied to the electromagnetic coil 15 is cancelled. As a result, the electromagnetic brake 5 that is locking the operating lever 4 at the stroke end position is deactivated, so that the operating lever 4 is automatically returned to its neutral position by means of the elastic force of each spring 13.

In the meantime, when the operating lever 4 is rocked by the operator from its neutral position to a direction perpendicular to the above-mentioned direction, for example, to the +Y direction in FIG. 3, an operating force having a predetermined magnitude is applied from the electromagnetic brake 5 to the operating lever 4 just before that the operating lever is rocked up to the stroke end position (30°) of the +Y direction as shown in FIG. 4B. Then, the operating lever 4 is locked at the stroke end position by means of the operating force, which is recognized as a click feeling by the operator who is holding the operating lever 4. In addition, at the point of time when the operating lever 4 is locked at the stroke end position of the +Y direction, the driving signal d is output from the output unit 85 of the control means 8 to the controller 19 of the automobile body to switch headlights to a high beam mode. Likewise, when the operator rocks the operating lever 4 from its neutral position to the −Y direction, a small operating force is applied from the electromagnetic brake 5 to the operating lever 4 just before the operating lever 4 is rocked up to the stroke end position (30°) of the −Y direction, which is then recognized as a click feeling by the operator who is holding the operating lever 4. Furthermore, at the point of time when the operating lever 4 is rocked up to the stroke end position of the −Y direction, the driving signal d is output from the output unit 85 of the controlling means 8 to the controller 19 of the automobile body to operate the flash-to-pass operation for the headlights. However, in this case, since the operating force applied from the electromagnetic brake 5 to the operating lever 4 is small, the operating lever 4 is not locked at the stroke end position of the −Y direction. Thus, the operating lever 4 is automatically returned to its neutral position by the elastic force of each spring 13 when the operating force in the −Y direction is removed from the operating lever 4.

As such, the turn signal switch in accordance with the present embodiment comprises the operating lever 4 manually operated by the operator, the supporting member 2 for rockably supporting the operating lever 4, the electromagnetic brake 5 arranged to be opposite to the base end of the operating lever 4, the optical image sensor 6 for detecting the operational state of the operating lever 4, and the controlling means 8 for controlling the drive of the electromagnetic brake 5 based on the output signal a from the optical image sensor 6, wherein the range of movement of the operating lever 4 is defined by the electromagnetic brake 5, and a predetermined tactile response corresponding to the operational state is given to the operating lever 4, so that the range of movement of the operating lever 4 can be set to any values, and a click feeling or the lock maintaining force required for the operating lever 4 can also be set to any values, which results in the turn signal switch having a simplified structure and wide general-purpose applicability. In other words, in the present embodiment, a case in which the range of movement of the operating lever 4 is defined to be four directions perpendicular to each other has been described. However, by means of a minor change of an external force table stored in the storage unit 82, the range of movement of the operating lever 4 may be defined to be four directions that are not mutually perpendicular, or may be defined to be other directions, and the operating force applied from the electromagnetic brake 5 to the operating lever 4 or the position thereof may be freely set.

In addition, the lower end surface 10*a* of the external force receiving portion 10 of the operating lever 4 is formed of a spherical shape whose center is a rocking point (the spherical portion 3) of the operating lever 4, and the armature 12, which is a component of the electromagnetic brake 5, is attached to the lower end surface 10*a* with the spring member 11 provided therebetween. Furthermore, the upper end surface of the yoke 14 wound with the electromagnetic coil 15 is arranged to be opposite to the armature 12, and the upper end surface of the yoke 14 is formed of a spherical shape corresponding to the shape of the lower end surface 10*a*. Therefore, when a voltage is applied to the electromagnetic coil 15, the armature 12 can be securely absorbed to the yoke, and when a voltage is not applied to the electromagnetic coil 15, it is possible to securely separate the armature 12 from the yoke 14 by means of the elastic force of the spring member 11. Furthermore, since the lining material 16 is attached to the upper end surface of the yoke 14, the armature 12 can be absorbed to the yoke 14 through the lining material 16 and the brake force of the electromagnetic brake 5 can be stabilized.

In addition, the optical image sensor 6 is used as detection means for detecting the operational state of the operating lever 4, the armature 12 is irradiated with light emitted from the light source, and an image of a detection pattern formed on the outer surface of the armature 12 is guided to the optical image sensor 6 through the image guide 18. Therefore, the structure of the detection means can be securely simplified. Furthermore, since the image guide 18 is arranged at the central positions of the yoke 14 and the electromagnetic coil 15, it is possible to simplify the structure of the detection means.

Furthermore, since the operating lever 4 is automatically return to its neutral position by means of the spring 13, the operating lever 4 can be securely returned to its neutral position by the elastic force of the spring 13 when the operator takes his hand off the operating lever 4. In addition, the output signal b from the angle sensor 7, which is a steering angle signal of the steering wheel, is input to the control means 8, and the action of the electromagnetic brake 5 is controlled based on the output signal b and the output signal a from the optical image sensor 6. Thus, by canceling the supply of the driving signal c to the electromagnetic coil 15 of the electromagnetic brake 5 when the steering wheel is rotated in a direction opposite to the rocking direction of the operating lever 4 in a state in which the operating lever 4 is locked at the stroke end position, the operating lever 4 can be automatically returned to its neutral position by the elastic force of the spring 13, and a cancel mechanism can be added to the turn signal switch.

Figure 5:
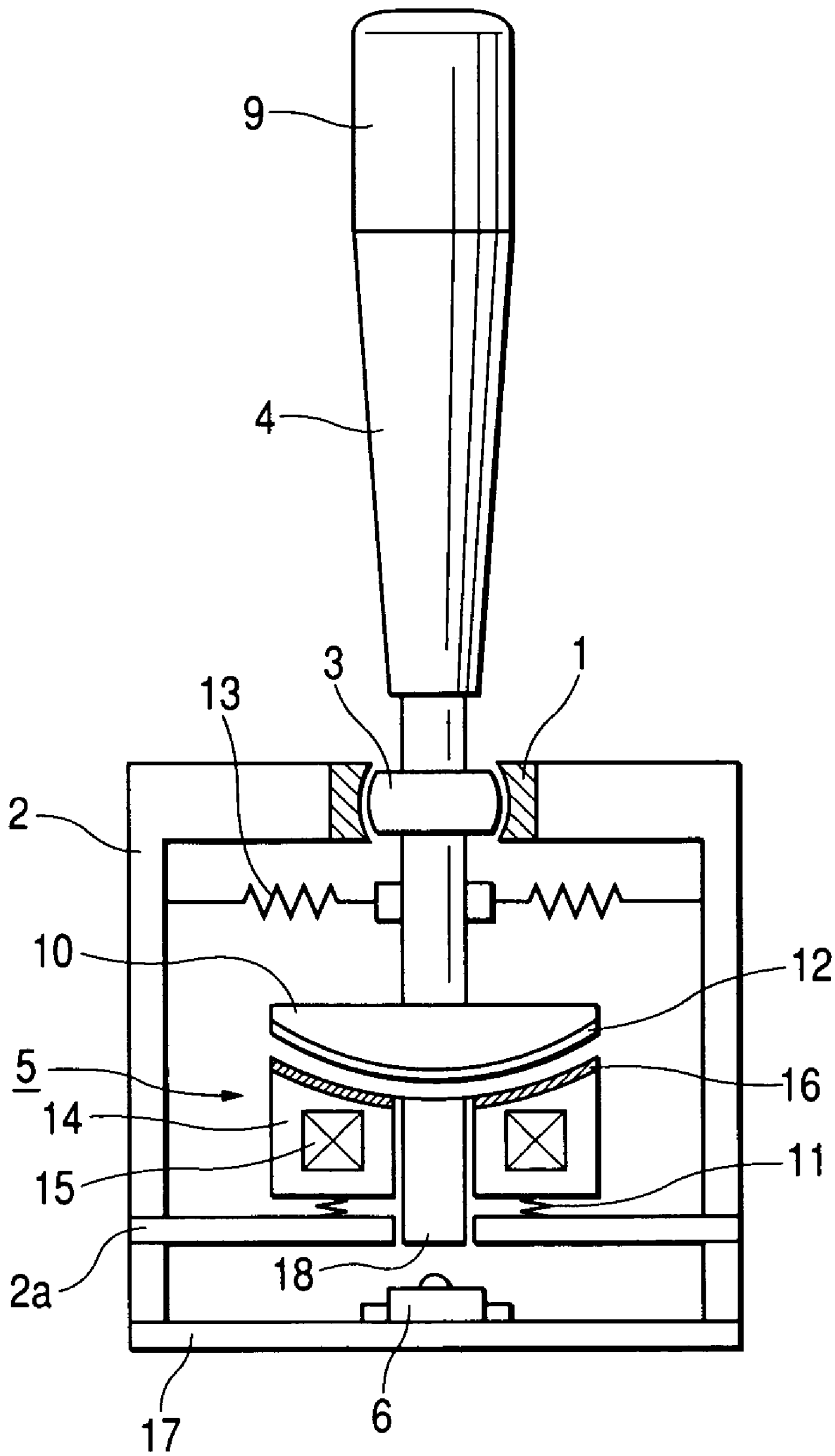
FIG. 5 is a view illustrating the structure of a stalk switch in accordance with another embodiment of the present invention.

Furthermore, in the present embodiment, it has been described a case in which the armature 12, which is a component of the electromagnetic brake 5, is attached to the lower end surface 10*a* of the operating lever 4 through the spring member 11, and the yoke 14 wound with the electromagnetic coil 15 is fixed on the mounting plate 2*a* integrated with the supporting member 2. However, as shown in FIG. 5, the armature 12 may be directly attached to the lower end surface 10*a* of the operating lever 4, and the yoke 14 wound with the electromagnetic coil 15 may be attached on a setting member, such as the mounting plate 2*a*, through the spring member 11.

Furthermore, in the present embodiment, it has been described a case in which the stalk switch of the present invention is applied to the turn signal switch. However, the present invention may be applied to a stalk switch for operating windshield wipers or a washing solution.

The present invention is implemented according to the above-mentioned embodiments and has the following effects.

The actuator is driven based on an output signal from detection means corresponding to the operational state of the operating lever, the range of movement of the operating lever is defined by the actuator, and a predetermined tactile response corresponding to the operational state is given to the operating lever. Thus, the range of movement of the operating lever can be set to any values by the same actuator, and a click feeling or the lock maintaining force required for the operating lever 4 can also be set to any values. Therefore, the stalk switch can have a simplified structure and wide general-purpose applicability.

What is claimed is:

1. A stalk switch, comprising:

an operating lever manually operated by an operator;

a supporting member for rockably supporting the operating lever;

an actuator arranged opposite to a base end of the operating lever;

detecting means for detecting an operational state of the operating lever; and controlling means for controlling drive of the actuator based on an output signal from the detecting means, wherein a range of movement of the operating lever is defined by the actuator, and a predetermined tactile response corresponding to the operational state is given to the operating lever;

wherein the actuator comprises an electromagnetic brake having an armature and an electromagnetic coil; and wherein the armature is attached to the base end of the operating lever through a spring member, and an end surface of a yoke wound with the electromagnetic coil is opposite to the armature.

2. The stalk switch according to claim 1, wherein the actuator comprises the electromagnetic brake having the armature attached to the base end of the operating lever and the yoke wound with the electromagnetic coil, and wherein the end surface of the yoke is opposite to the armature, and the yoke is attached to a setting member through a spring member.

3. The stalk switch according to claim 2, wherein the armature is formed of a spherical shape whose center is a rocking point of the operating lever, and the end surface of the yoke is formed of the same shape as that of the armature.

4. The stalk switch according to claim 3, wherein an optical image sensor is used as the detecting means, and wherein light emitted from a light source is reflected from the armature and is incident on the optical image sensor to detect the operational state of the operating lever.

5. The stalk switch according to claim 4, wherein an image guide is provided between the armature and the optical image sensor and is arranged at a center of the electromagnetic coil.

6. The stalk switch according to claim 2, wherein an optical image sensor is used as the detecting means, and wherein light emitted from a light source is reflected from the armature and is incident on the optical image sensor to detect the operational state of the operating lever.

7. The stalk switch according to claim 6, wherein an image guide is provided between the armature and the optical image sensor and is arranged at a center of the electromagnetic coil.

8. The stalk switch according to claim 2, wherein an elastic member is provided for automatically returning the operating lever to a neutral position that is set in the supporting member.

9. The stalk switch according to claim 8, wherein a steering angle signal is input to the controlling means, and the controlling means controls the drive of the actuator based on the steering angle signal and the output signal from the detecting means.

10. The stalk switch according to claim 1, wherein the armature is formed of a spherical shape whose center is a rocking point of the operating lever, and the end surface of the yoke is formed of the same shape as that of the armature.

11. The stalk switch according to claim 10, wherein an optical image sensor is used as the detecting means, and wherein light emitted from a light source is reflected from the armature and is incident on the optical image sensor to detect the operational state of the operating lever.

12. The stalk switch according to claim 11, wherein an image guide is provided between the armature and the optical image sensor and is arranged at a center of the electromagnetic coil.

13. The stalk switch according to claim 10, wherein an elastic member is provided for automatically returning the operating lever to a neutral position that is set in the supporting member.

14. The stalk switch according to claim 1, wherein an optical image sensor is used as the detecting means, and wherein light emitted from a light source is reflected from the armature and is incident on the optical image sensor to detect the operational state of the operating lever.

15. The stalk switch according to claim 14, wherein an image guide is provided between the armature and the optical image sensor and is arranged at a center of the electromagnetic coil.

16. The stalk switch according to claim 1, wherein an elastic member is provided for automatically returning the operating lever to a neutral position that is set in the supporting member.

17. The stalk switch according to claim 16, wherein a steering angle signal is input to the controlling means, and the controlling means controls the drive of the actuator based on the steering angle signal and the output signal from the detecting means.

18. The stalk switch according to claim 1, wherein an elastic member is provided for automatically returning the operating lever to a neutral position that is set in the supporting member.

19. The stalk switch according to claim 18, wherein a steering angle signal is input to the controlling means, and the controlling means controls the drive of the actuator based on the steering angle signal and the output signal from the detecting means.

* * * * *